(12) United States Patent
McEwan et al.

(10) Patent No.: US 7,415,778 B1
(45) Date of Patent: Aug. 26, 2008

(54) TAPE MEASURE WITH MOVING TAPE EXIT PORT

(75) Inventors: Sean M. McEwan, Raleigh, NC (US); Christopher T. Cluff, Apex, NC (US); Brian D. Westbrook, Raleigh, NC (US)

(73) Assignee: Cooper Brands, Inc., Houston, TX (US)

( * ) Notice: Subject to any disclaimer, the term of this patent is extended or adjusted under 35 U.S.C. 154(b) by 37 days.

(21) Appl. No.: 11/675,853

(22) Filed: Feb. 16, 2007

(51) Int. Cl.
G01B 3/10 (2006.01)
(52) U.S. Cl. .................. 33/761; 242/395; 242/615.3
(58) Field of Classification Search .............. 33/759, 33/760, 761, 769; 242/395, 395.1, 405, 615.3
See application file for complete search history.

(56) References Cited

U.S. PATENT DOCUMENTS

| | | | |
|---|---|---|---|
| 2,711,030 A | 6/1955 | Drew et al. | |
| D178,567 S | 8/1956 | Holscher | |
| 3,325,116 A | 6/1967 | Quenot | |
| D208,066 S | 7/1967 | Collura et al. | |
| 3,686,767 A | 8/1972 | Duda et al. | |
| 4,164,334 A * | 8/1979 | Rathbun et al. | 33/761 |
| 4,639,982 A | 2/1987 | Kasai | |
| 4,688,337 A | 8/1987 | Dillner et al. | |
| 4,924,597 A | 5/1990 | Tursi | |
| D310,043 S | 8/1990 | Kang | |
| 4,949,436 A | 8/1990 | Anscher | |
| D311,697 S | 10/1990 | Kang | |
| D322,943 S | 1/1992 | Sun | |
| D324,346 S | 3/1992 | Ogasawara | |
| 5,131,122 A | 7/1992 | Lavato | |
| 5,222,279 A | 6/1993 | Frano et al. | |
| D341,329 S | 11/1993 | Morris | |
| D351,561 S | 10/1994 | Moffatt et al. | |
| D365,769 S | 1/1996 | Kang | |
| 5,515,617 A | 5/1996 | Canfield | |
| D377,911 S | 2/1997 | Ogasawara | |
| D396,012 S | 7/1998 | Walsten | |
| D398,870 S | 9/1998 | Konen et al. | |
| 5,845,412 A | 12/1998 | Arcand | |
| D408,749 S | 4/1999 | Walsten | |
| D410,859 S | 6/1999 | Hioki | |
| D418,765 S | 1/2000 | Martone et al. | |
| D422,227 S | 4/2000 | Lin | |
| D423,380 S | 4/2000 | Kram | |
| D430,047 S | 8/2000 | Martone et al. | |
| 6,115,931 A | 9/2000 | Arcand | |
| D431,480 S | 10/2000 | Walsten et al. | |
| D441,671 S | 5/2001 | Hsu | |
| D453,480 S | 2/2002 | Stocker et al. | |
| D457,448 S | 5/2002 | Olson | |

(Continued)

Primary Examiner—G. Bradley Bennett
(74) Attorney, Agent, or Firm—Coats & Bennett PLLC

(57) ABSTRACT

A tape measure includes a housing that includes a frame and a mouthpiece body moveable mounted to the frame. The mouthpiece body includes a tape exit port that is moveable, advantageously rotatably, and may include an external recess aligned with the exit port. A measuring tape is supported by the housing and selectively deployable from the housing via the exit port. The movable exit port may allow the tape to enter the housing along a line that is tangent to the coil of tape rotatably supported by the housing. This tangency is advantageously maintained as the size of the coil changes due to the amount of tape therein. Other aspects and methods are also disclosed.

39 Claims, 16 Drawing Sheets

U.S. PATENT DOCUMENTS

| | | |
|---|---|---|
| D466,423 S | 12/2002 | Kram |
| D478,292 S | 8/2003 | Hsu |
| 6,640,460 B1 | 11/2003 | Nabarro et al. |
| 6,658,755 B2 * | 12/2003 | Arlinsky ............ 33/760 |
| 6,663,153 B2 | 12/2003 | Brunson |
| D489,012 S | 4/2004 | Olson |
| D490,330 S | 5/2004 | Konen |
| 6,839,981 B2 | 1/2005 | Rafter |
| 6,931,743 B1 | 8/2005 | Scarborough |
| 7,055,260 B1 | 6/2006 | Hoffman |
| D524,666 S | 7/2006 | Huang |
| 7,222,437 B2 * | 5/2007 | Spanski et al. ............ 33/760 |
| 2002/0088135 A1 * | 7/2002 | Arlinsky ............ 33/760 |
| 2003/0131491 A1 | 7/2003 | Weeks |

* cited by examiner

TAPE MEASURE WITH MOVING TAPE EXIT PORT

BACKGROUND

The present invention relates to a tape measure that utilizes a flexible tape blade that is deployable and retractable relative to an associated housing for taking distance measurements.

Tape measures typically include a housing and a measuring tape. The tape is selectively deployable from, and retractable into, the associated housing for taking a measurement and storage, respectively. The measuring tape is typically stored as a convolute coil inside the housing, with the lead section of the tape being routed through an opening in the housing called the mouth or tape exit port. During retraction, the tape may experience stresses due to various geometrical relationships, and may tend to whip back and forth, particularly as the last portions of the tape are retracted. Several approaches have been proposed for dealing with this situation. For example, U.S. Pat. No. 6,698,679, which is incorporated herein by reference, discloses that a sliding grip element may be used to help cushion the tape during retraction. However, the approach of the '679 patent, and other prior art approaches, have not proven completely satisfactory for all situations. Thus, there remains a need for alternative designs of tape measures, advantageously ones that allow the mouth of the tape measure housing to assist in reducing stresses experienced by the tape during retraction.

SUMMARY

In one illustrative embodiment, a tape measure comprises a housing comprising a frame and a rotating body rotatingly mounted to the frame; the rotating body defining an external wall of the housing and comprising a tape exit port defined in the external wall. A measuring tape is supported by the housing and selectively deployable from the housing via the exit port. The rotating body may include an external recess aligned with the exit port and disposed downstream therefrom. While the rotating body is advantageously rotatable at least 20°, the frame and rotating body may include features that interact to limit the amount of rotation of the rotating body. The rotating body may be formed by two portions secured together, and the two portions may be substantially identical.

In another embodiment, a tape measure comprises a casing; a reel supported by the casing for rotation about a first axis; and a mouthpiece body rotatably mounted to the casing for rotation about a second axis spaced from the first axis. The mouthpiece body comprises an exit channel extending along an exit axis and is upstream bounded by a tape exit port. The tape exit port is rotationally moveable relative to the second axis. A measuring tape forms a convolute coil of multiple layers about the reel. The number of layers changes as the tape is deployed or retracted through the exit port. Therefore, the convolute coil has a first configuration of N layers when the tape is fully retracted and a second configuration of fewer layers when the tape is deployed. The exit axis is oriented tangent to the convolute coil for both the first and second configurations, with the exit axis oriented closer to the first axis when the convolute coil assumes the second configuration than when the convolute coil assumes the first configuration. The casing may comprise a handle spaced from the first axis, with the first axis disposed between the handle and the mouthpiece body.

In another embodiment, a tape measure comprises a housing comprising a frame and a mouthpiece body mounted to the frame for rotation about a first axis. The mouthpiece body defines an external wall of the housing and comprising a tape exit port defined in the external wall. The mouthpiece body further comprises an exit channel extending along an exit axis and upstream bounded by the tape exit port. A reel supported by the housing for rotation about a second axis, and a measuring tape forms a convolute coil about the reel and is selectively deployable through the tape exit port. A first theoretical line extends through the first and second axes. The mouthpiece body is mounted to the housing such that an angular relationship between the exit axis and the line varies depending on an amount of the tape forming the coil on the reel.

In another embodiment, a method of operating a tape measure comprises deploying a measuring tape from a housing at a tape exit port; the housing having a frame and a mouthpiece body moveably mounted to the frame; the mouthpiece body forming the exit port; retracting the deployed tape and thereby increasing a size of a convolute coil of the measuring tape associated with the housing; and moving the mouthpiece body relative to the frame in response to changes in size of the convolute coil during the retracting. Moving the mouthpiece body may comprise rotating the mouthpiece body or otherwise. The tape advantageously extends through the exit port along a theoretical line that is tangent to the coil.

In another embodiment, a tape measure comprises a housing comprising a frame and a mouthpiece body moveably mounted to the frame; the mouthpiece body comprising a tape exit port; a reel rotatably supported by the frame; a measuring tape forming a convolute coil about the reel and selectively deployable through the tape exit port; the mouthpiece body moving relative to the frame in response to changes in size of the convolute coil. The frame may include a track, and the mouthpiece body may comprise a slider constrained to move along the track. The mouthpiece body may be rotatably mounted to the frame. The tape, between the exit port and the convolute coil, may extend along a theoretical line from the tape exit port to the convolute coil that is tangent to the convolute coil, and the tape, downstream from the exit port, advantageously extends along the theoretical line.

Other aspects of various embodiments of the inventive apparatus and related methods are also disclosed in the following description. The various aspects may be used alone or in any combination, as is desired.

DETAILED DESCRIPTION

The present invention relates generally to a tape measure that employs a moving body to define the tape exit port. For simplicity, a manually wound tape measure utilizing a non-self-supporting tape blade will be used below as a non-limiting illustrative example in order to provide an understanding of one or more embodiments of the invention. However, it should be understood that the tape measure may be a power return tape measure or a manually wound tape measure, and the relevant tape blade may be self-supporting with significant standout, or may be non-self-supporting, as is desired.

Figure 1:
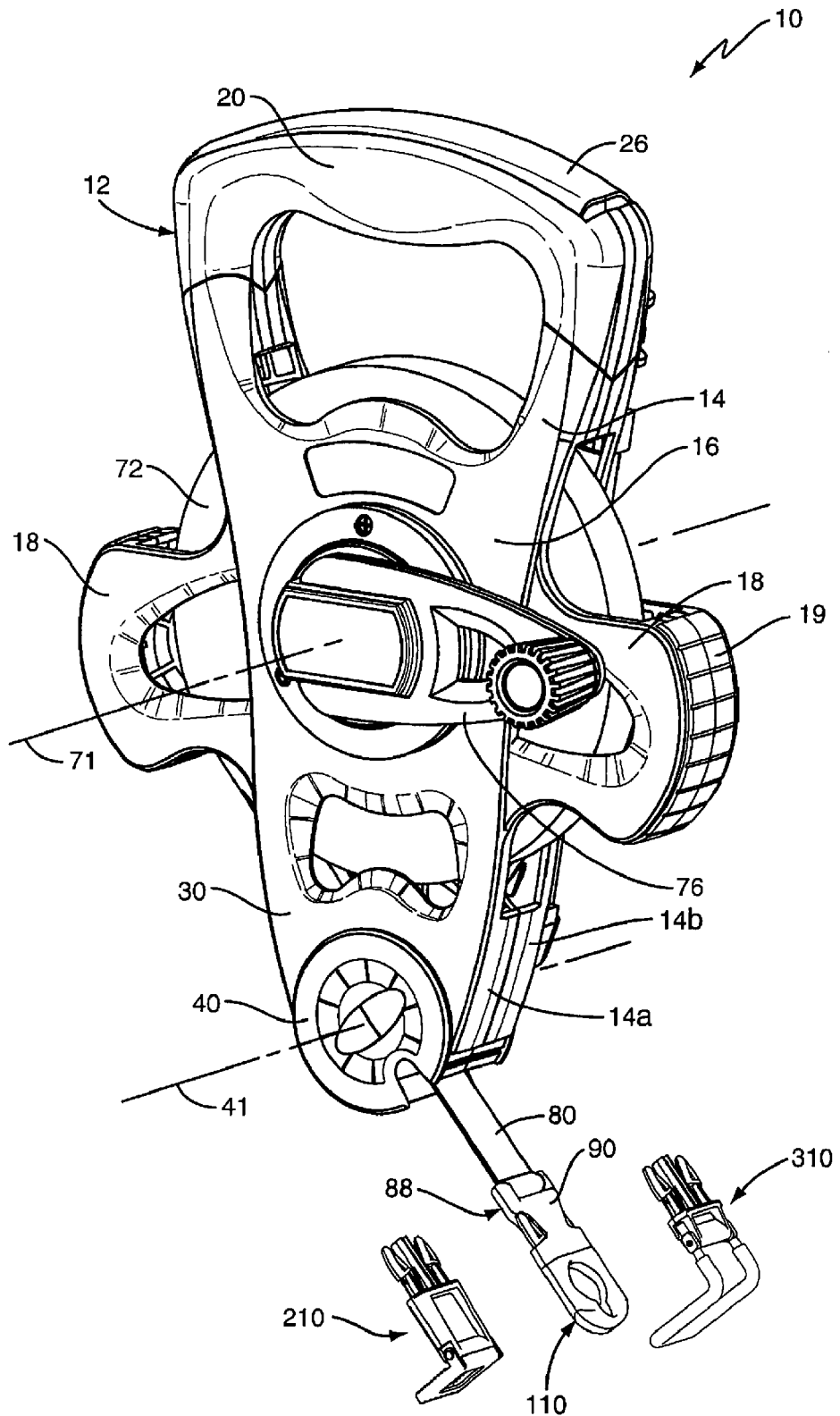
FIG. 1 shows a perspective view of one embodiment of a tape measure with the tape in a deployed position.

As illustrated in FIG. 1, a manually wound tape measure, generally designated 10, is shown constructed according to the present invention. The tape measure 10 includes a housing 12, a tape 80, a tape coupler 90, and a plurality of end fittings 110, 210, 310. The housing 12 includes a frame or shell 14, a tape reel 70, and a crank assembly. The frame 14 forms the main body of the housing 12, and is typically formed by shell halves 14a, 14b that are held together by screws 15, snap-fits, or the like. The frame 14 includes a central area 16, side arms 18, a handle 20, and a lower arm 30. The side arms 18 extend laterally outward from the central area 16, and may advantageously include suitable cushions 19 on their farthest extent. The handle 20 is disposed above the central area 16 and provides a convenient means to hold the tape measure 10. The lower arm 30 extends downward from the central area 18 and provides a means for controlling the routing of the tape 80 when being deployed or retracted.

Figure 2:
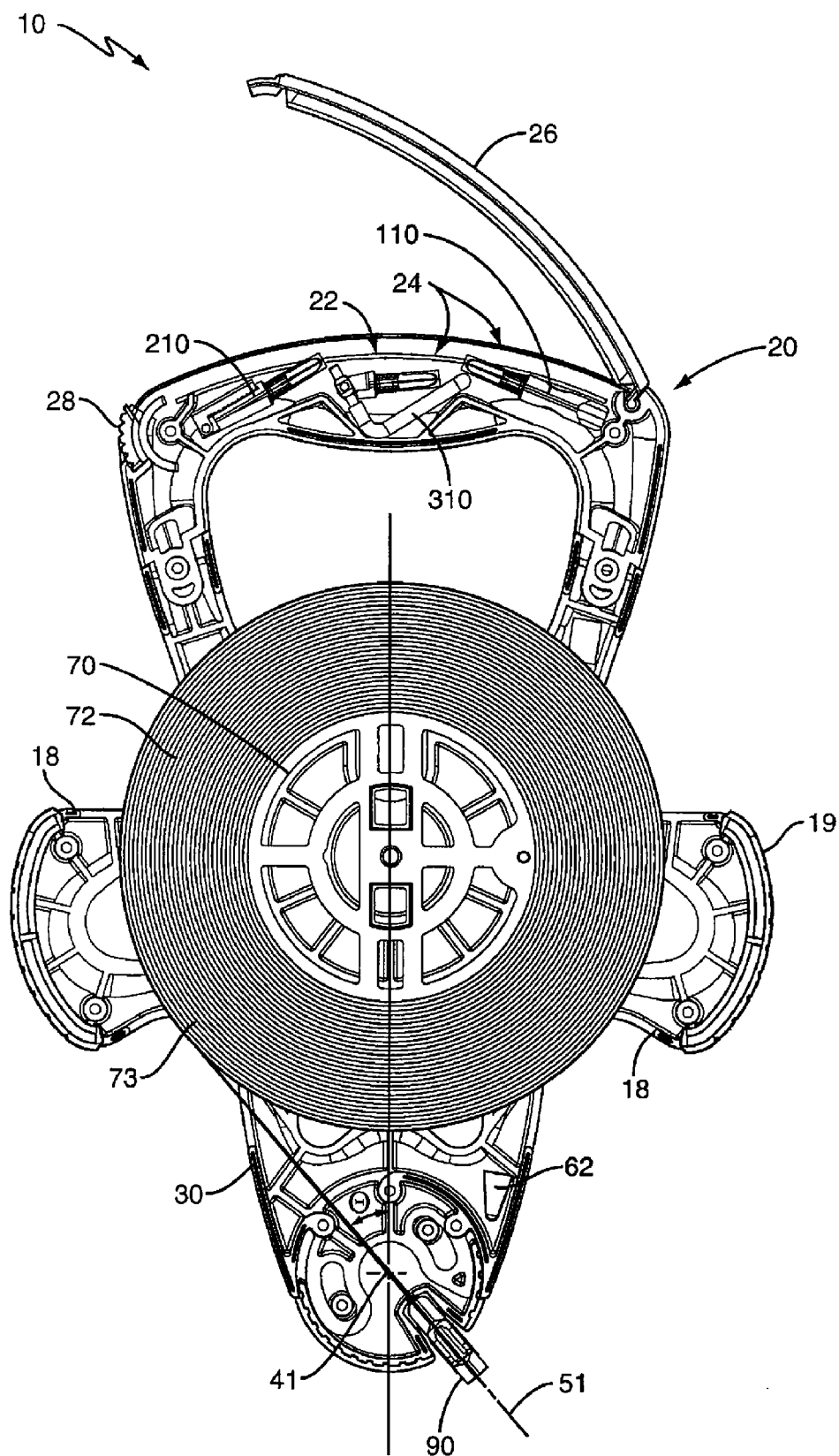
FIG. 2 shows a front view of a tape measure employing a relatively large reel at the center of the tape coil with a portion of the housing removed for clarity.

Referring to FIG. 2, the tape reel 70 is rotatably supported by shell 14 for rotation about rotational axis 71, which advantageously lies along the vertical midline of housing 12. The reel 70 typically takes the form of a simple frame structure with a circular peripheral wall. The tape reel 70 may include suitable features (not shown) for anchoring the trailing end 86 of tape 80, as is known in the art. The tape reel 70 may be of any suitable diameter, and it may be advantageous to use a larger diameter reel 70 for shorter length tapes 80, so as to both increase take-up effectiveness and provide a fuller appearance for greater customer acceptance.

Referring again to FIG. 1, the crank assembly 76 may take any form known in the art, but typically extends through the appropriate shell half 14a or 14b and connects to reel 70 so as to control the rotation thereof. The crank mechanism 76 may include a crank and various gears (not shown) for causing the tape reel 70 to rotate when the crank is turned. The crank mechanism 76 may, if desired, take the form of the greater than 1:1 ratio gear mechanism described in either U.S. Pat. No. 6,464,160 or U.S. Pat. No. 4,813,625, both of which are incorporated herein by reference. Of course, other greater than 1:1 ratio gear mechanisms may be used, such as ones with three planetary gears, etc. It should be noted that the particular details of crank mechanism 76 employed are not important to understanding the present invention.

Figure 3:
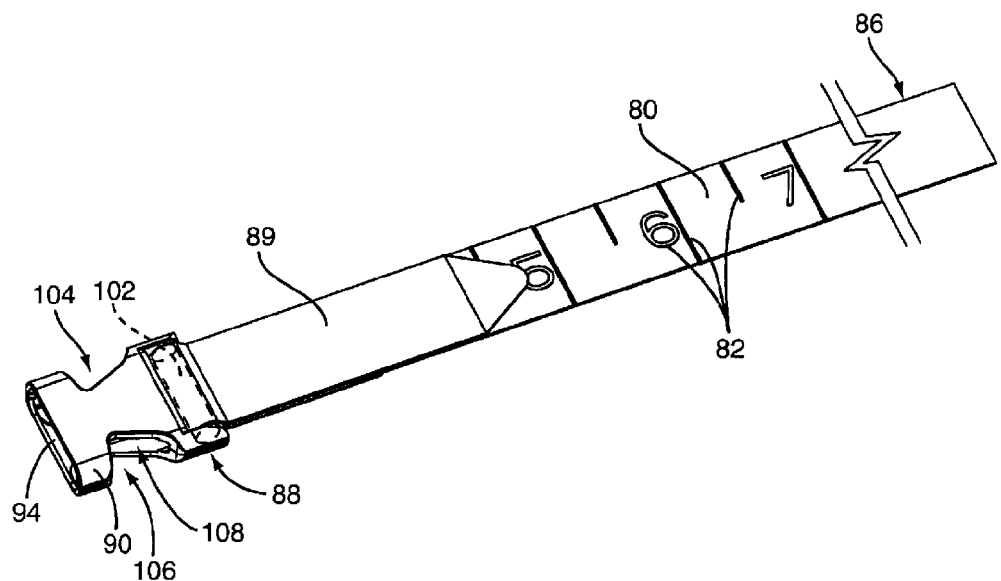
FIG. 3 shows a perspective view of a portion of a tape, including the end portion, with a tape coupler attached.
Figure 4:
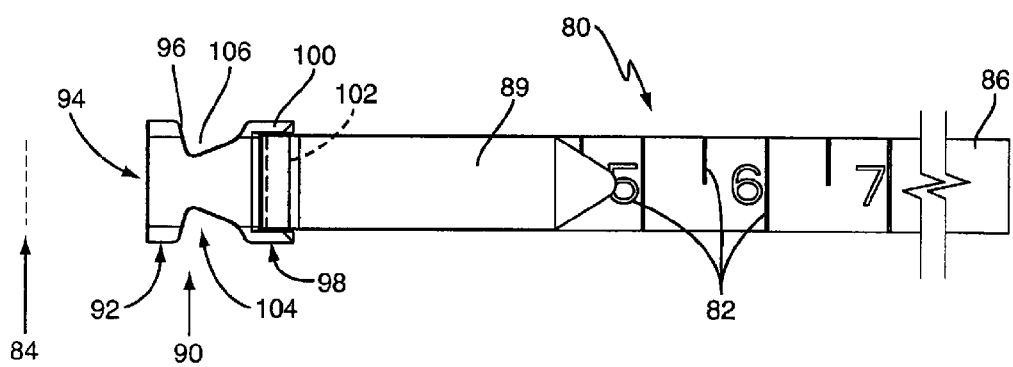
FIG. 4 shows a top view of FIG. 3.

The tape 80 may take any suitable form known in the art, but advantageously takes the form of a fiberglass reinforced polyvinylchloride tape of approximately ¾ inch width and fifty or one hundred foot length. Referring to FIGS. 3-4, the tape 80 includes at least one length measuring scale 82 visible thereon, and optionally more than one. This scale 82 may be associated with the tape 80 by printing, embossing, engraving, or any other method known in the art. The measuring scale 82 has a point where the scale reaches a value of zero, known in the art as the zero point 84. This zero point 84 is advantageously not located on the tape 80 itself, but instead is located a short distance forward of the leading edge of tape 80. See FIG. 4. As shown in FIG. 2, the tape 80 is generally wound on the tape reel 70 in the form of a convolute coil 72 of multiple layers 73. One end of the tape, the anchor end 86, is anchored to the tape reel 70 in any suitable conventional fashion. The opposing end of the tape, the free end 88, is routed out of housing lower arm 30. The tape coupler 90, discussed below, is attached to the tape free end 88, typically via a loop formed in the end of tape 80. This loop may be reinforced by a suitable flexible reinforcing strip 89, which may advantageously be made from an approximately 1/64 inch thick flexible vinyl material, with or without external ribbing.

As pointed out above, the tape measure 10 includes a plurality of end fittings 110, 210, 310 that are distinct from housing 12. Each of these end fittings 110, 210, 310 is designed to be releasably coupled to the tape 80 so that the user may select the appropriate end fitting 110, 210, 310 for a particular job, and configure the tape measure 10 accordingly. Thus, instead of having only a single permanently attached end fitting (e.g., a single permanently attached end hook), the tape measure 10 has a plurality of interchangeable end fittings 110, 210, 310 that may be joined to the tape 80, one in place of another. In order to facilitate this, an interlocking male-female buckle connection 78 is provided. Examples of interlocking male-female buckle connections, in general, can be found in U.S. Pat. Nos. 5,222,279; 5,131,122; 4,949,436; and 4,639,982, which are each incorporated herein by reference. In particular, a tape coupler 90 is secured to tape free end 88, and each of the end fittings 110, 210, 310 includes a complementary coupling structure 79. Advantageously, the coupling structures 79 are substantially identical across the various end fittings 110, 210, 310. The tape coupler 90 and the coupling structure 79 releasably interlock to secure the selected end fitting 110, 210, 310 to tape 80. This releasable engagement may be somewhat similar to the releasable interlocking engagement of a so-called side-release buckle, but advantageously with an interference fit between the clamping/clamped surfaces of the connection 78. As can be appreciated, one end fitting 110, 210, 310 may be attached to the tape coupler 90 at a time.

Referring to FIGS. 5-13, the tape coupler 90 includes a distal portion 92, a proximal portion 98, and an intermediate portion 104 that are advantageously integrally formed. The distal portion 92 includes a opening 94 that faces away from tape 80, and a bearing surface 96 disposed in spaced relation to opening 94. Opening 94 leads to chamber 108 that extends through distal portion 92 and into intermediate portion 104. Proximal portion 98 includes two rearwardly extending arms 100 and a cross-member 102 that extends between the arms 100. This cross-member 102 is spaced from intermediate portion 104, so that a gap is formed therebetween, through which tape 80 may be routed to attach coupler 90 to tape 80. Intermediate portion 104 includes two lateral openings 106 that open into chamber 108, and that are partially defined by the respective bearing surfaces 96. The tape 80 may be looped around cross-member 102 and then secured to itself so as to permanently attach the tape coupler 90 to tape free end 88.

Figure 5:
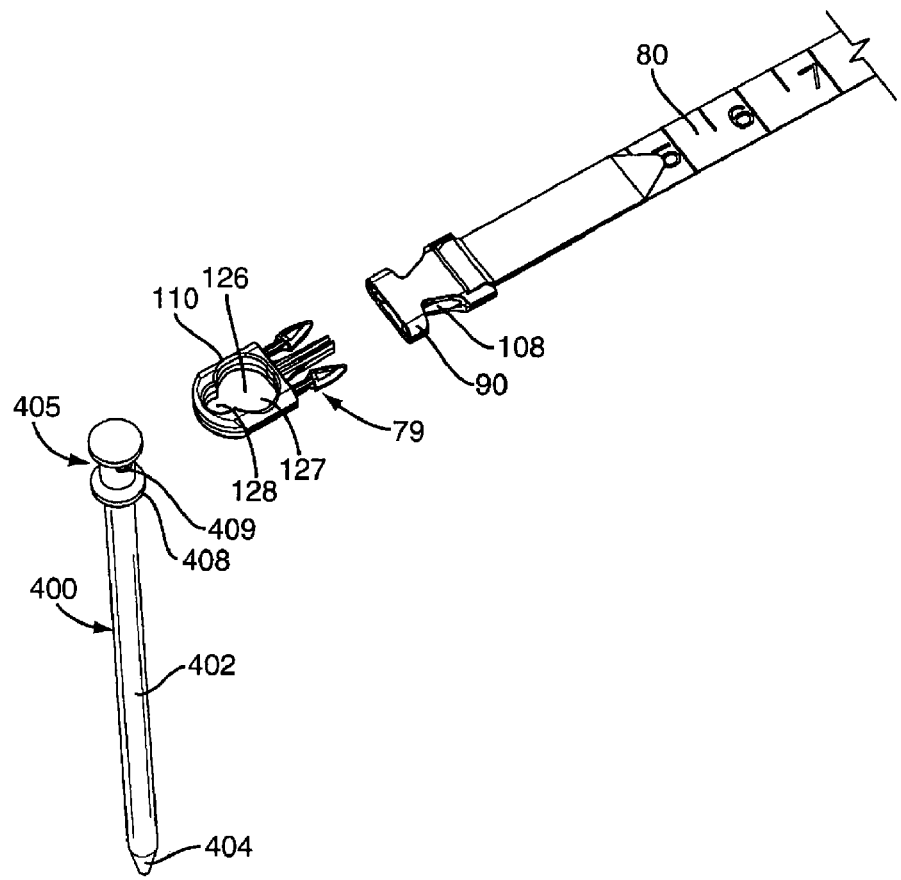
FIG. 5 shows an exploded perspective view of an end fitting attached to the tape.
Figure 6:
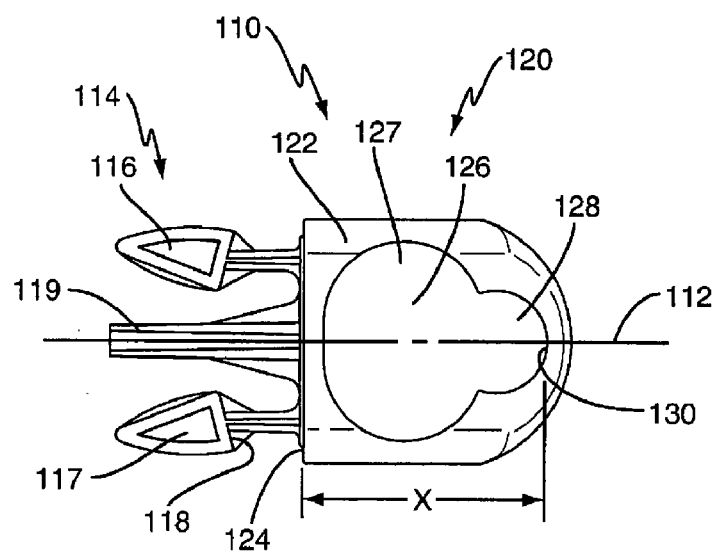
FIG. 6 shows a top view of the end fitting of FIG. 5.
Figure 7:
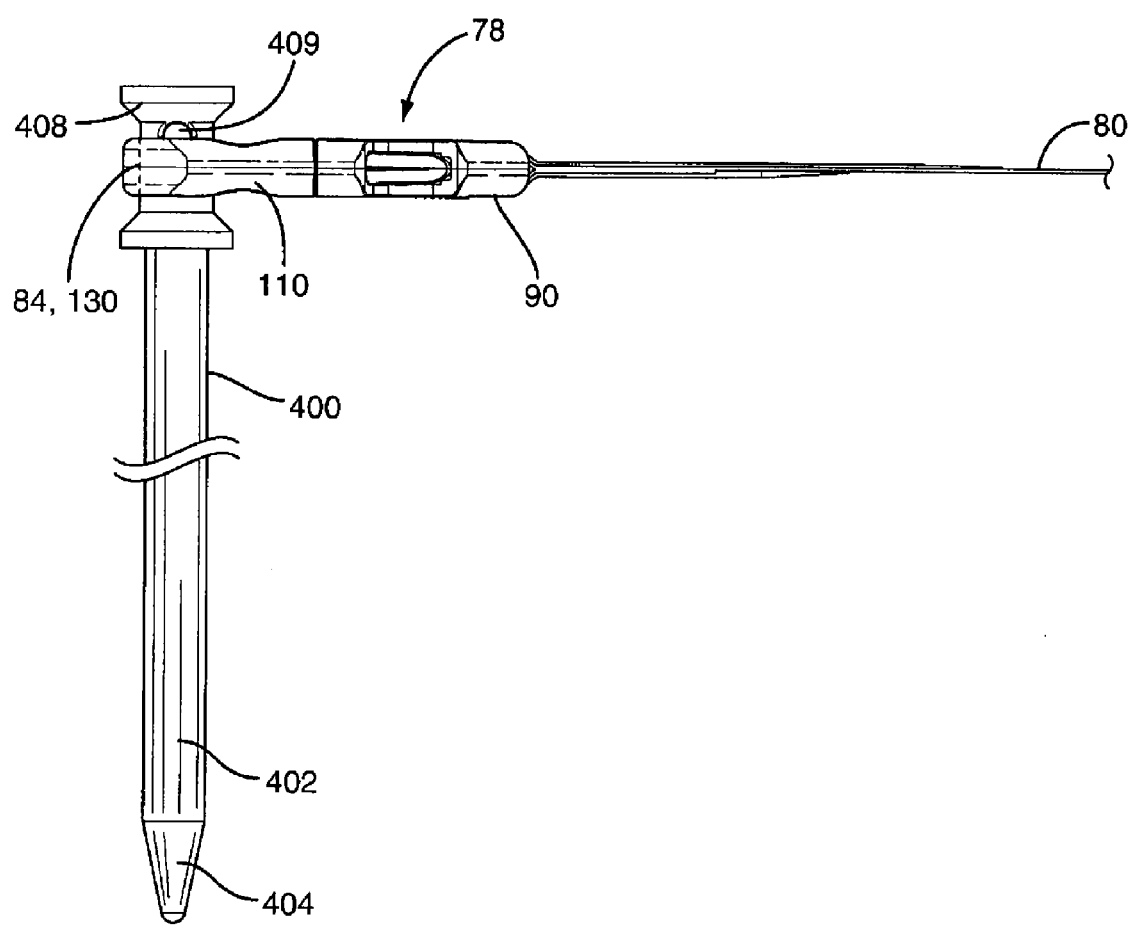
FIG. 7 shows a side view of the end fitting of FIG. 5 attached to a tape and in conjunction with a spike.

One embodiment of an end fitting is shown in FIGS. 5-7, and generally indicated at 110. End fitting 110 includes a proximal portion 114 and a distal portion 120 disposed along an end fitting axis 112. The proximal portion 114 includes a pair of rearwardly extending prongs 116 that bracket a rearwardly extending central post 119. The prongs 116 include a barb 117 on their end, with a clamping surface 118 defined thereon. The central post 119 aids in inserting the proximal portion 114 of end fitting 110 into opening 98, and may take any appropriate form known in the side-release buckle art. The distal portion 120 of end fitting 110 includes a frame 122 that extends forward from proximal portion 114. A hole 126 extends through frame 122 and has a geometry that includes a larger diameter section 127 and a smaller diameter section 128 disposed forwardly therefrom. The forwardmost portion of hole 126 defines an abutment surface 130 that is disposed generally normal to axis 112. A portion of frame 122 defines a rearwardly facing clamping surface 124 that is disposed in spaced relation to the clamping surfaces 118 of barbs 117. When end fitting 110 is lockingly engaged with coupler 90, clamping surface 118 abuts against bearing surface 96 of tape coupler 90, and clamping surface 124 abuts against the front face of coupler 90. In this fashion, coupler distal portion 92 is captured between clamping surfaces 118, 124 in order to lockingly hold end fitting 110 together with tape coupler 90. Further, in embodiments employing an interference fit between the relevant portions, the end fitting 110 may advantageously be held firmly to coupler 90, without any significant "wiggle".

The end fitting 110 may be used with a spike 400 to measure a distance. The spike 400 may take a variety of forms, but advantageously includes a shank 402 and a head 405. The shank 402 may be generally cylindrical and terminate at a pointed tip 404. The head 405 includes two spaced apart annular flanges 408 of larger diameter than shank 402, and may optionally include a laterally extending hole 409 therethrough for a pull strap or the like. The annular flanges 408 are sized smaller than the larger diameter portion 127 of hole 126 in end fitting 110. The spike 400 may be made from a suitable metallic material, such as aluminum. The spike 400 is intended to be driven into the ground, so as to provide one anchoring location for taking a measurement. The head 405 of spike 400 is inserted partially through hole 126 in end fitting 110 so that frame 122 is disposed between annular flanges 408. Tension is then applied to tape 80 in order to pull end fitting 110 so that end fitting 110 moves backward relative to spike 400 thereby moving spike 400 into the smaller diameter section 128 of hole 126 and against abutment surface 130. The annular flanges 408 then act to help keep end fitting 110 engaged on spike 400 while the tape 80 is further deployed from housing 12 in order to take the desired measurement. It should be noted however that end fitting 110 does not require spike 400 in order to function. Indeed, the end fitting 110 may be used with a simple nail or other appropriate anchoring means, as is desired. However, use of the spike 400 is believed advantageous.

Figure 8:
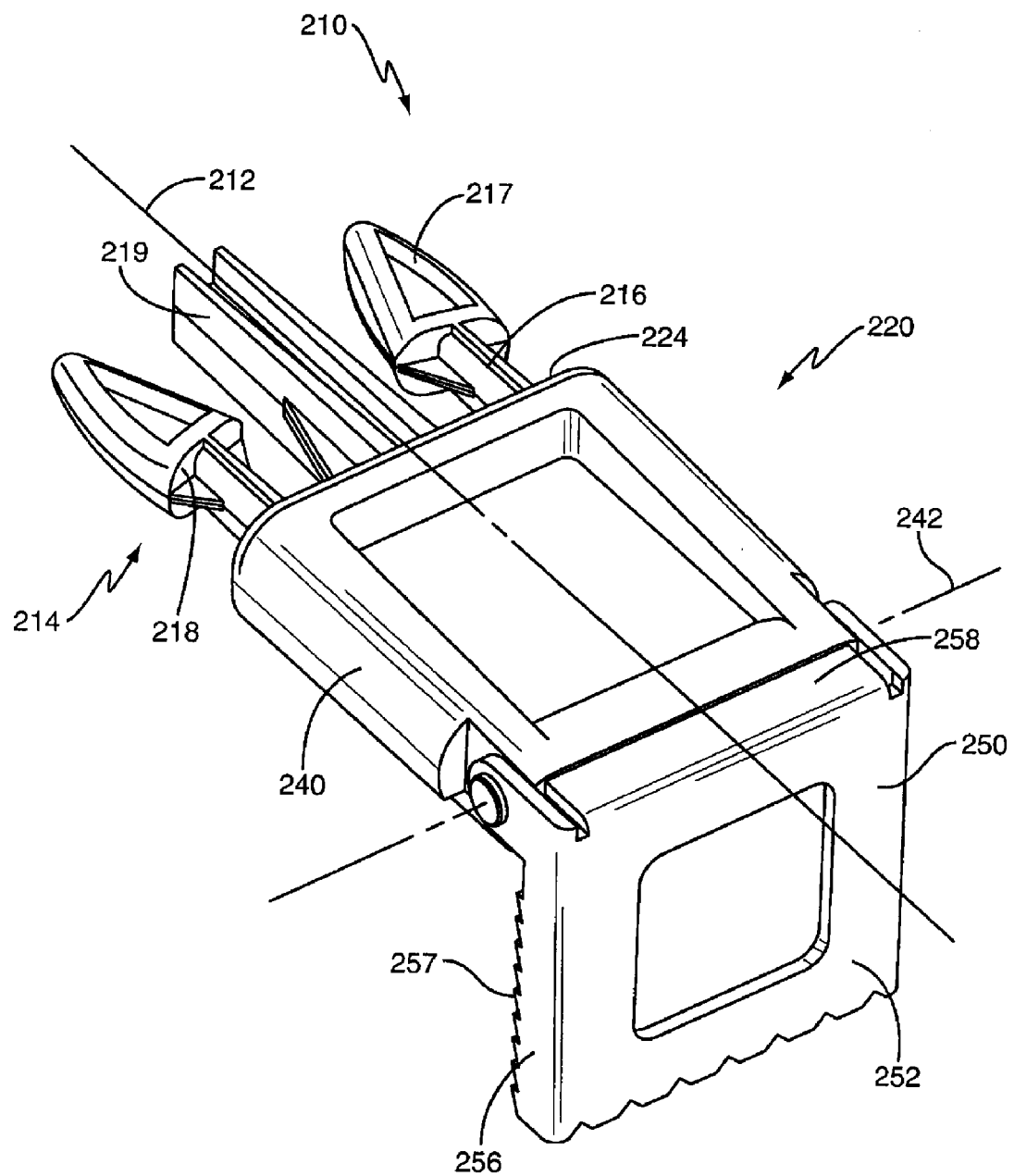
FIG. 8 shows a perspective view of another end fitting embodiment.
Figure 9:
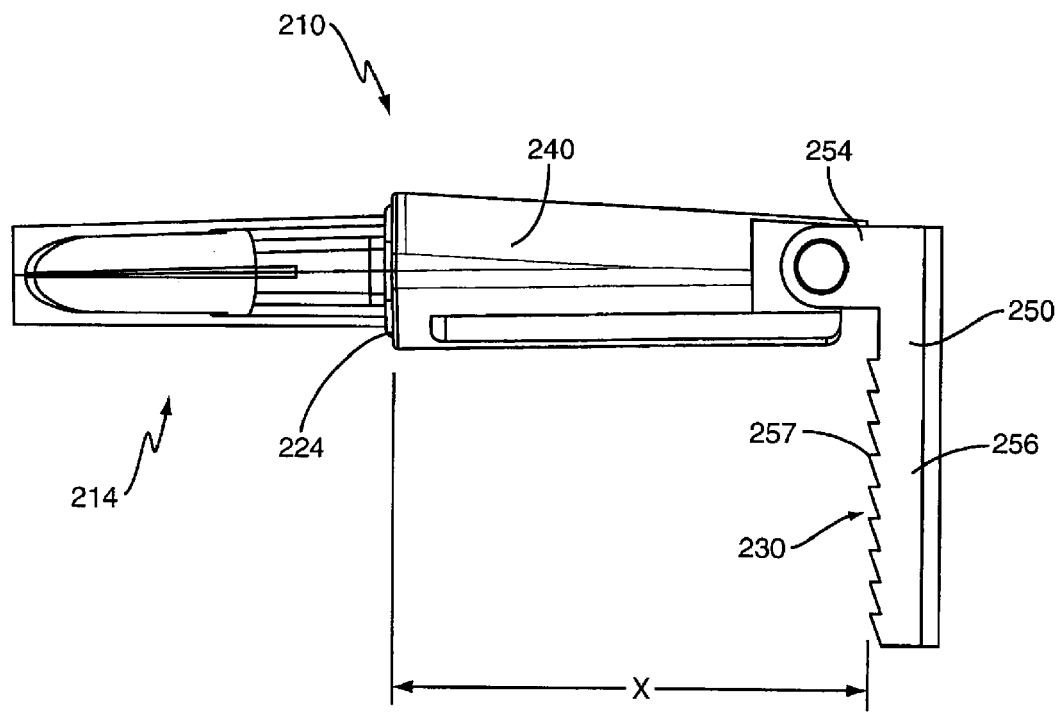
FIG. 9 shows a side view of the end fitting of FIG. 8 with the hook portion in the deployed position.
Figure 10:
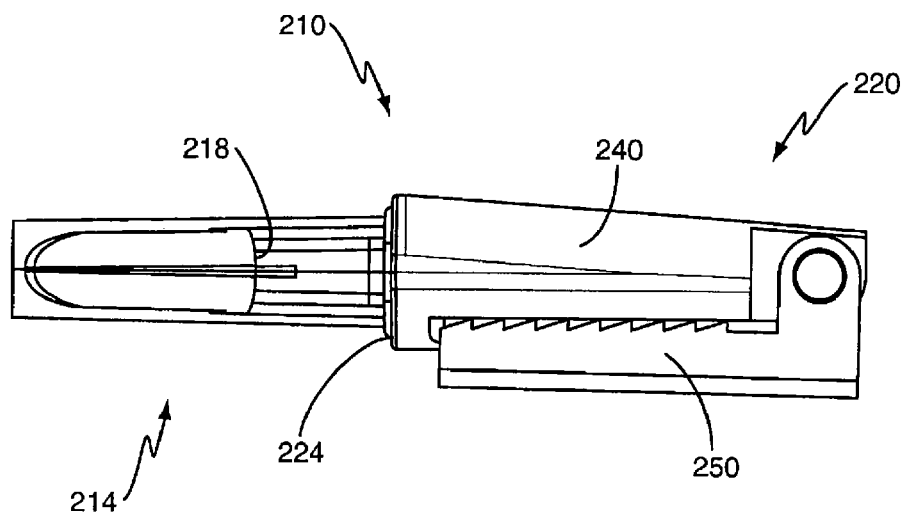
FIG. 10 shows a side view of the end fitting of FIG. 8 with the hook portion in the storage position.

Another embodiment of an end fitting is shown in FIGS. 8-10, and generally indicated at 210. End fitting 210 is similar to end fitting 110 in many respects, and similar reference numbers are therefore used for similar features, but incremented by one hundred. Thus, as can be seen, end fitting 210 includes a proximal portion 214 and a distal portion 220 disposed along an axis 212. The proximal portion 214 is similarly configured to proximal portion 114, and includes prongs 216 with barbs 217 having clamping surfaces 218 defined thereon, and a post 219, which function as described above with reference to end fitting 110. Unlike unitary distal portion 120 of end fitting 110, distal portion 220 of end fitting 210 includes a frame 240 and a hook portion 250 pivotally mounted to the frame 240. The frame 240 may be substantially block-like, with recessed upper and lower surfaces if desired. The rear portion of frame 240 defines clamping surface 224, while the forward portion of frame 240 includes a laterally running pivot passage (not shown) that extends along pivot axis 242. The hook portion 250 includes a generally planar hook plate 252, optionally with a nail slot defined therein. A top flange 258 and respective side flanges 256 extend from the edges of hook plate 252 generally normal thereto. The side flanges 256 may include a plurality of teeth 257 that together form the abutment surface 230. A pair of mounting legs 254 join hook portion 250 to frame 240. A rivet or other suitable means may be used to pivotally connect hook portion 250 to frame 240, with the rivet extending through the pivot passage and suitable holes in mounting legs 254, and then deformed as appropriate. The hook portion 250 is moveable between a storage position where the hook plate 252 is disposed generally parallel to axis 212 (FIG. 10), and a measuring position where the abutment surface 230 is disposed normal to axis 212 (FIG. 9). This type end fitting 210 may be hooked on a suitable surface, such as an edge of a board, to help releasably anchor the tape free end 88 for measurement purposes. Further, the forward face of the frame 240 is advantageously positioned to be, with hook portion in the storage position (FIG. 10), on the same plane as abutment surface 230 with the hook portion in the measurement position (FIG. 9). With this arrangement, end fitting 210 may be used to take an "inside" measurement by abutting the forward face of frame 240, with hook portion in the storage position, against the relevant measurement surface.

Figure 11:
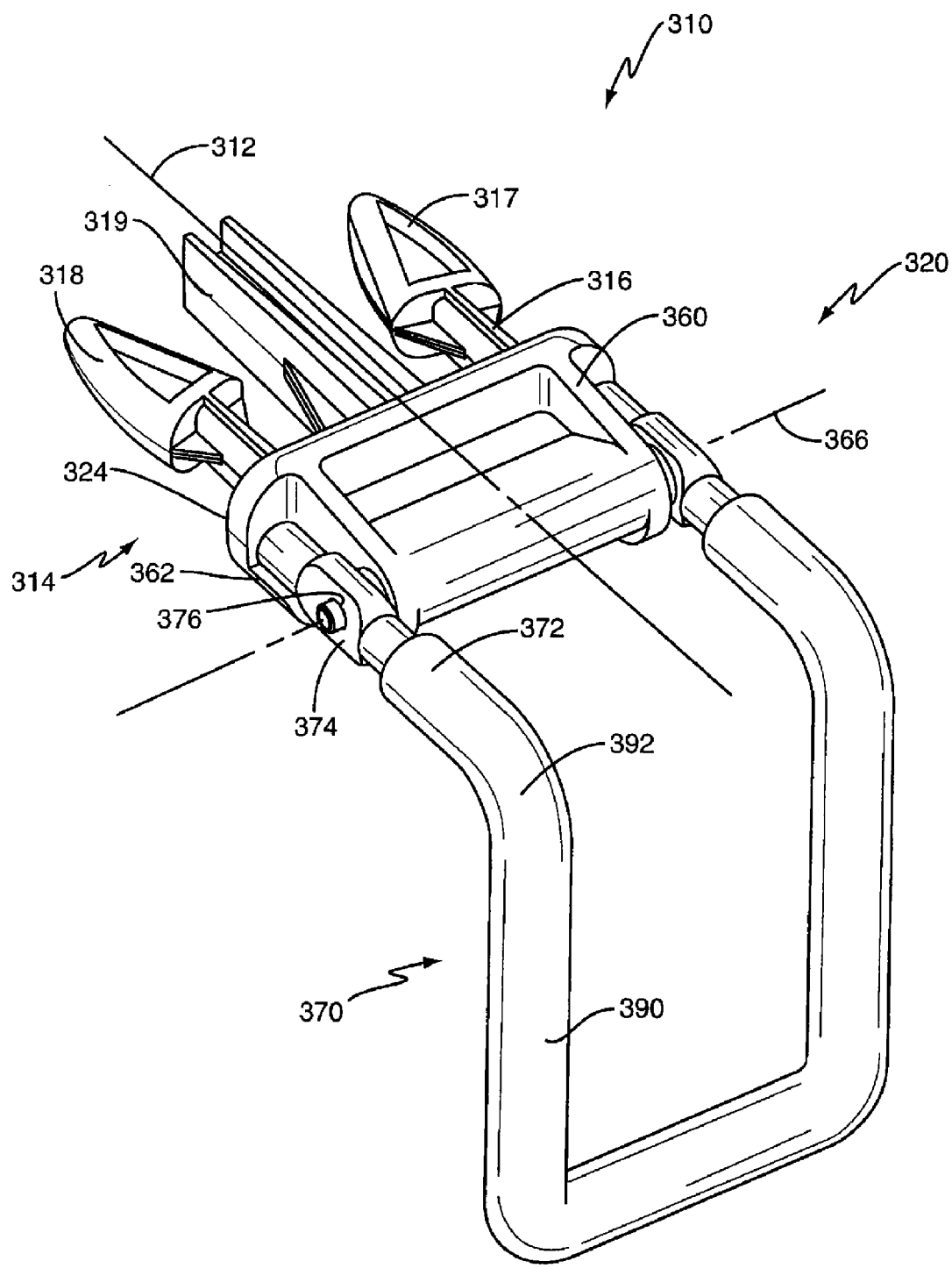
FIG. 11 shows a perspective view of another end fitting embodiment.
Figure 12:
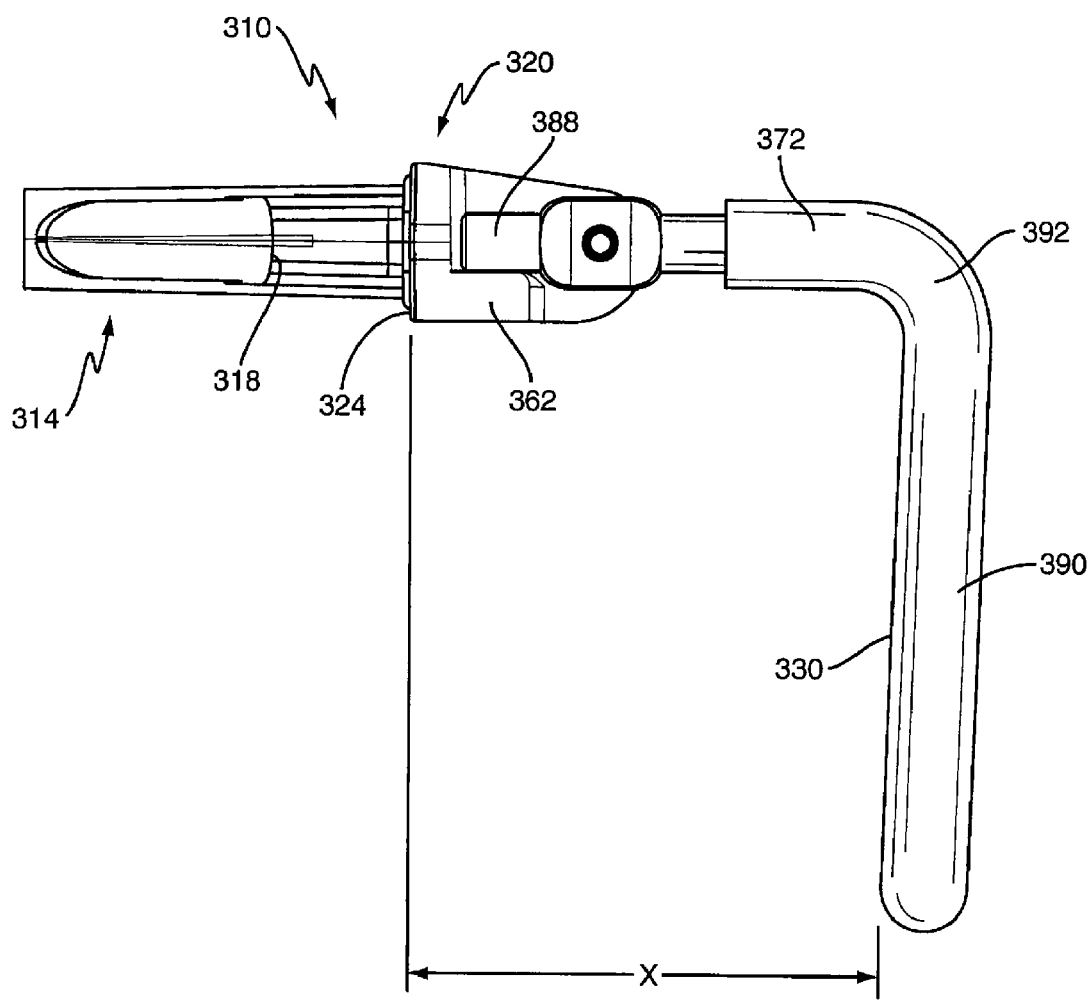
FIG. 12 shows a side view of the end fitting of FIG. 11 with the hook portion in the deployed position.
Figure 13:
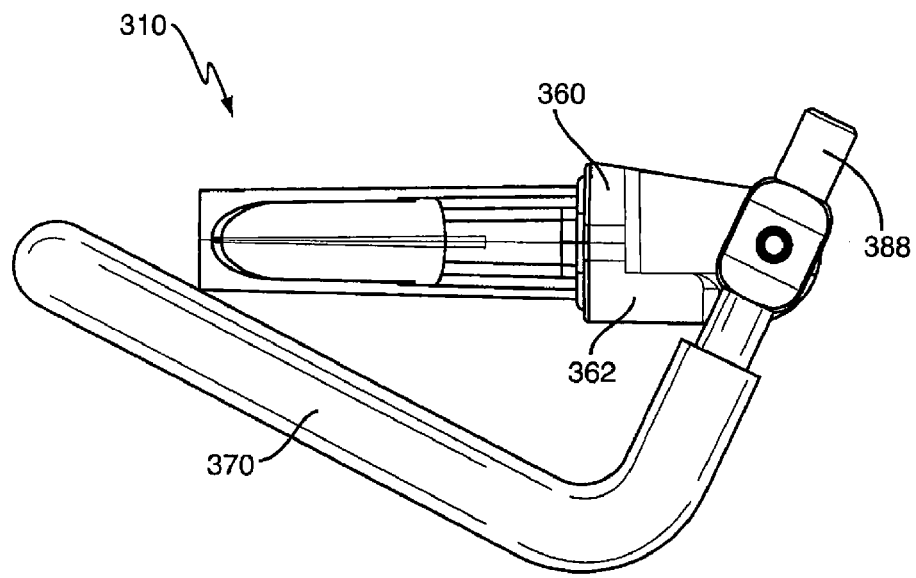
FIG. 13 shows a side view of the end fitting of FIG. 11 with the hook portion in the storage position.

Another embodiment of an end fitting is shown in FIGS. 11-13, and generally indicated at 310. End fitting 310 is similar to end fitting 110 in some respects, and similar reference numbers are therefore used for similar features, but incremented by two hundred. Thus, end fitting 310 includes a proximal portion 314 and a distal portion 320 disposed along an axis 312. The proximal portion 314 is similarly configured to proximal portion 114, and includes prongs 316 with barbs 317 having clamping surfaces 318 defined thereon, and a post 319, which function as described above with reference to end fitting 110. Unlike the unitary distal portion 120 of end fitting 110, distal portion 320 of end fitting 310 includes a frame 360 and a hook portion 370 pivotally mounted to the frame 360. As with end fitting 210, a riveted or other suitable arrangement may be used to provide the desired pivoting connection between frame 360 and hook portion 370. The frame 360 may be similar to frame 240 of end fitting 210, but is advantageously shorter. The rear portion of frame 360 defines a clamping surface 324, while the forward portion of frame 360 includes a laterally running pivot passage (not shown) that extends along pivot axis 366. The hook portion 370 includes a rigid wire piece that appears generally U-shaped in front view and L-shaped in side view. The wire piece includes a shorter proximal leg 372, a longer distal leg 390, and a bend therebetween 392. The proximal leg 372 may include a flattened area 374 having a hole 376 therein, with the hole aligned 376 with transverse pivot axis 366. The proximal leg 372 advantageously extends beyond pivot axis 366 to form an extension section 388. The distal leg 390 may be covered in a suitable "grippy" material, such as a vinyl coating. The inside face of the distal leg 390 defines abutment surface 330. The hook portion 370 is moveable between a storage position where the distal leg 390 is disposed at a relatively small angle relative to axis 312 (FIG. 13), and a measuring position where abutment surface 330 is disposed normal to the axis 312 (FIG. 12). Advantageously, extension section 388 of hook portion 370 abuts against a stop boss 362 on frame 360 to positively stop the rotation of hook portion 370 at the appropriate location corresponding to the measuring position, while proximal leg 372 abuts against stop boss 362 to positively stop the rotation of hook portion 370 at the appropriate location corresponding to the storage position.

While three illustrative end fitting embodiments 110, 210, 310 have been discussed, the end fittings may have other configurations, as is desired. Further, the tape measure 10 does not require three end fittings 110, 210, 310 in all embodiments. For example, some embodiments of the tape measure 10 may have two end fittings, or four or more end fittings. Further, the tape measure 10, in some embodiments, may have multiple iterations of the same end fitting configuration.

As noted above, each of the end fittings 110, 210, 310 includes an abutment surface 130, 230, 330 and a clamping surface 124, 224, 324 on the respective frames 122, 240, 360. Advantageously, the longitudinal distance X (along the respective end fitting axis 112, 212, 312) between the respective pairs of clamping surface 124, 224, 324 and abutment surface 130, 230, 330 is constant across the various end fittings 110, 210, 310. For embodiments where abutment surface 224, 324 is formed by a pivoting body, the distance X is measured with the body disposed in the measuring position, i.e., with the abutment surface 224, 324 disposed normal to the corresponding axis 212, 312 (see FIG. 9, FIG. 12). Thus, the relevant abutment surface 130, 230, 330 is disposed a known consistent distance from tape free end 88, and thus at a known point relative to measuring scale 82, regardless of which end fitting 110, 210, 310 is attached to tape coupler 90. Advantageously, the spacing is such that the abutment surface 130, 203, 330 is disposed at the zero point 84 of scale 82.

While not required in all embodiments, it should be noted that the interlocking male-female buckle connection 78 is advantageously inline with the tape blade 80. More particularly, when the interlocking male-female buckle connection 78 is made, and normal measuring tension (e.g., 4.5 pounds-force) is applied to tape blade 80, then the tape coupler 90 and the proximal portion 114, 214, or 314 of the corresponding connected end fitting 110, 210, or 310 advantageously lie along the plane of the tape blade 80.

While not required in all embodiments, the use of the interlocking male-female buckle connection 78 beneficially allows the end fittings 110, 210, 310 to be easily coupled to the tape coupler 90. Indeed, the end fittings 110, 210, 310 advantageously may be joined to the tape coupler 90 when the tape 80 is in its fully retracted state (FIG. 2), and advantageously with only one hand. In addition, in some embodiments, an attached end fitting 110, 210, 310 may be disengaged from the tape coupler 90, and therefore decoupled from the tape 80, when the tape 80 is in its fully retracted state, again advantageously with only one hand.

While the interlocking male-female buckle connection 78 described above is of the side-release buckle type, this is not required by all embodiments. For example, the interlocking male-female buckle connection 78 may instead be of a center/top-release type, such as similar to the one described in U.S. Pat. No. 4,949,436.

The housing 12 may advantageously include a storage compartment 22 for storing one or more, and advantageously all, of the end fittings 110, 210, 310 while not in use. The storage compartment 22 may be located as desired. For example, the storage compartment 22 may be disposed in handle 20, as shown in FIG. 2. A cover 26 may be pivotally attached to handle 20, and be moveable to open or close storage compartment 22. A latch 28 may be disposed proximate the opposing end of cover 26, with the latch 28 being moveable to engage cover 26 to holding cover closed or to allow cover 26 to be opened. The latch 28 may take any suitable form, and may be biased if desired, or simply held in place by sliding friction. If, as in some embodiments, the handle 20 is overmolded with an elastomer, the cover 26 may advantageously be similarly overmolded and/or colored. The storage compartment 22 may advantageously include various zones 24 therewithin that are appropriately tailored to receive corresponding end fittings 110, 210, 310, and to advantageously hold them to prevent undesirable rattling during transport. Advantageously, end fittings that include relatively moveable parts (e.g., end fitting 210, 310) are stored in a compact configuration.

While the housing 12 may include a single common internal storage compartment 22 that is able to store all the end fittings 110, 210, 310 simultaneously, this is not required in all embodiments. In some embodiments, the housing includes multiple storage compartments (not shown), such as one for each end fitting 110, 210, 310, which may be internal or external (i.e., always open to the outside).

Figure 14:
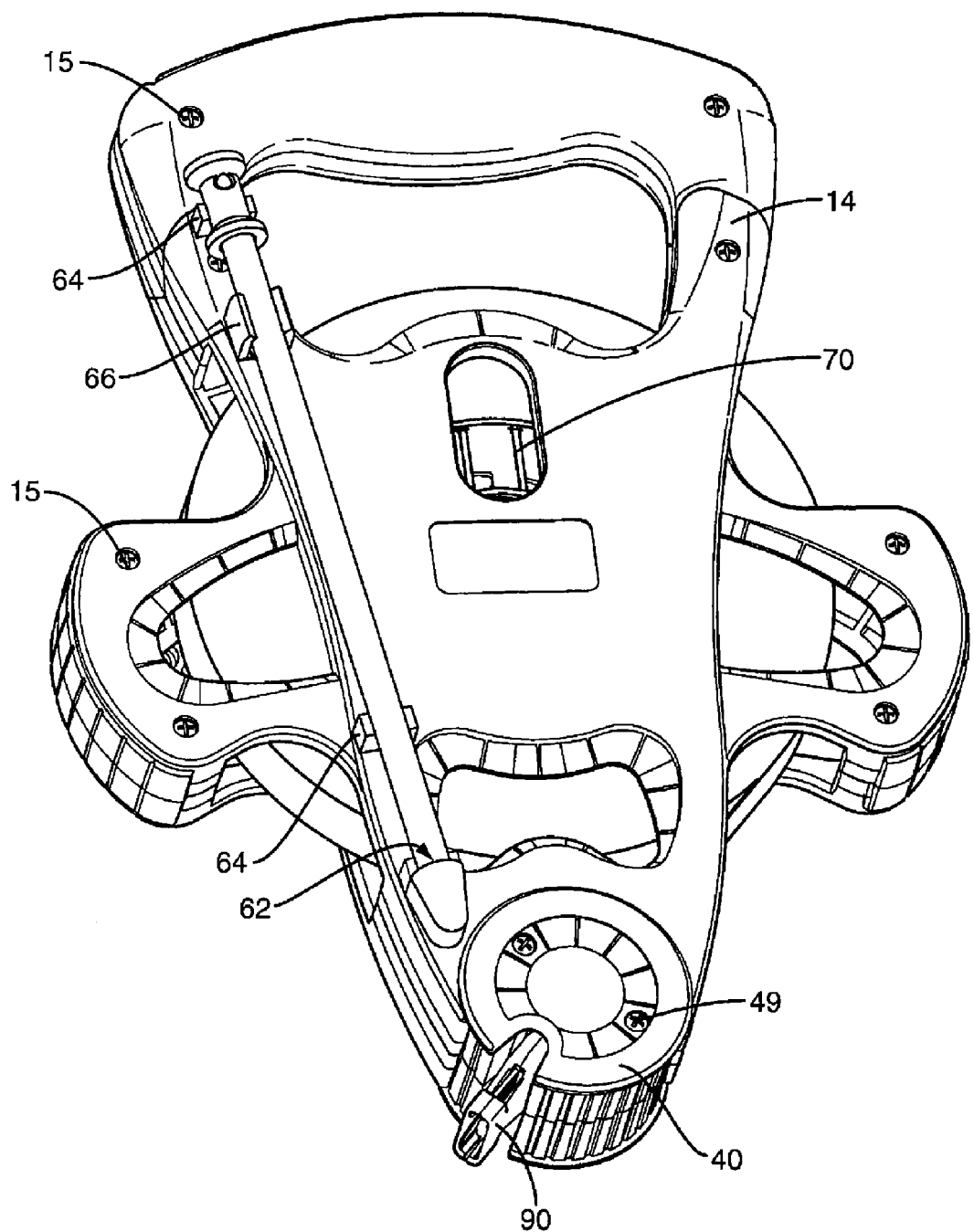
FIG. 14 shows a rear view of a tape measure embodiment with integrated spike storage capability.

Further, in some embodiments, the tape measure 10 may include a spike 400 as generally described above. For such embodiments, it may be advantageous for the housing 12 to include suitable means for storing spike 400 in a secure fashion. For example, as shown in FIG. 14, the housing 12 may include a covered recess 62 for receiving spike point 404, with suitable supports 64 disposed in spaced relation, and an integral gripping clip structure 66 for releaseably grasping spike 400. Advantageously, the spike head 405, when stored, is proximate where cover 26 pivots, so as to avoid awkwardness when opening and closing storage compartment 22.

Figure 15:
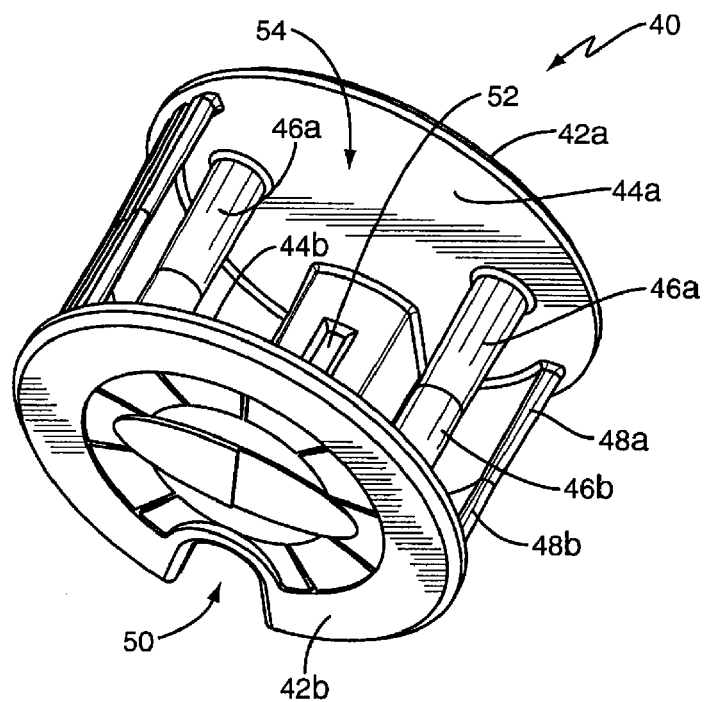
FIG. 15 shows a perspective view of a rotating body suitable for forming the tape mouth port for the tape measure of FIG. 1.
Figure 16:
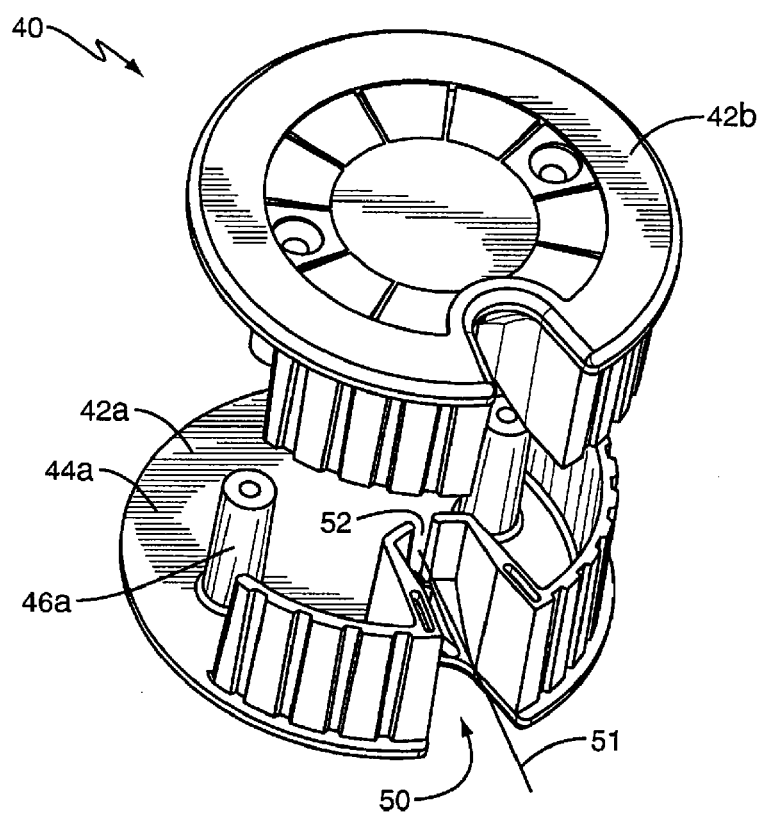
FIG. 16 shows a rear exploded perspective view of the rotating body of FIG. 15.
Figure 17:
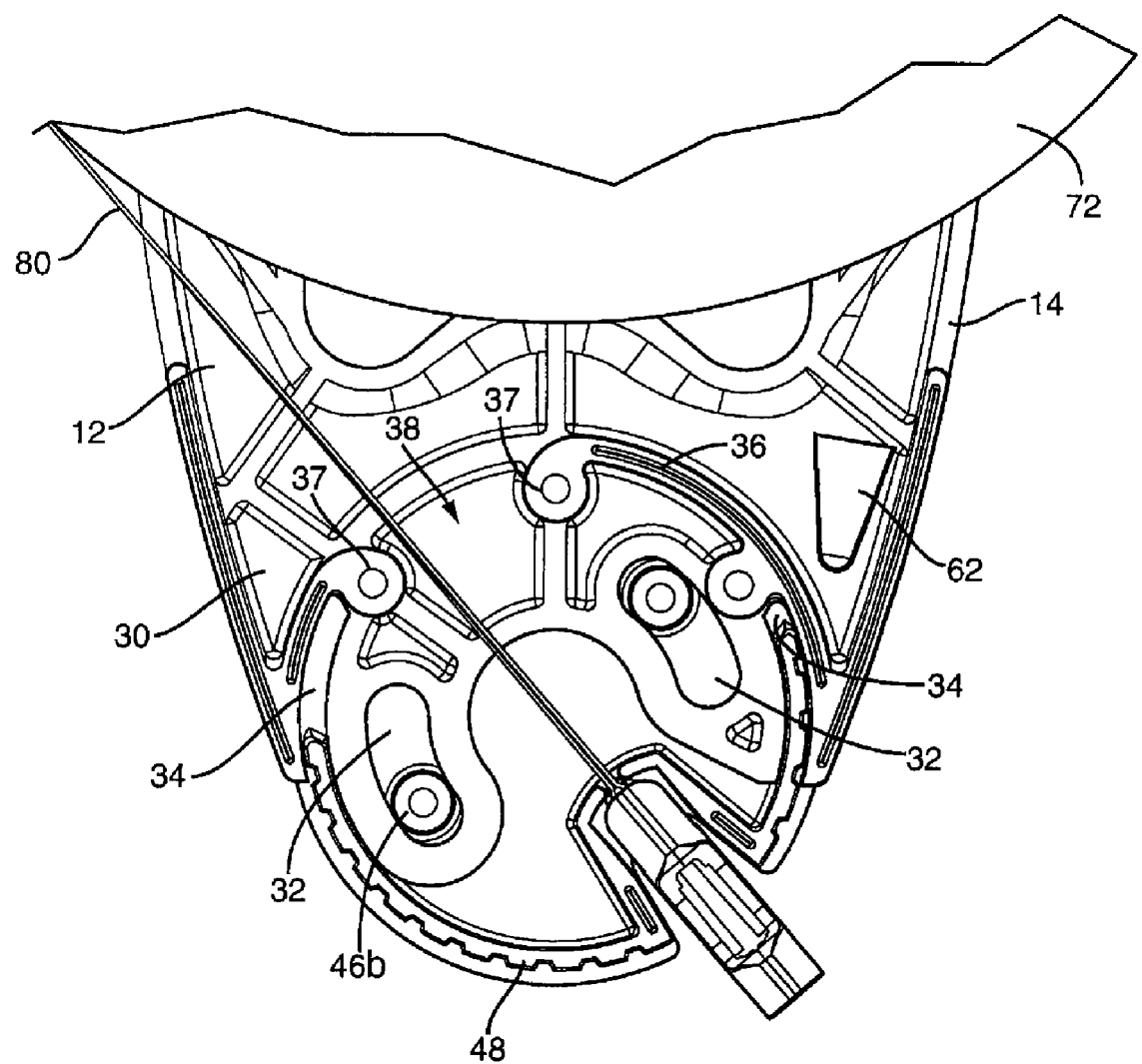
FIG. 17 shows how the rotating body of FIG. 15 may be rotatably coupled to a tape measure housing.

The lower arm of housing 12 may include a statically oriented mouth through with the tape is deployed/retracted, such as that disclosed in U.S. Pat. No. 6,698,679, which is incorporated herein by reference. However, some embodiments of the tape measure 10 may advantageously include a moveable mouthpiece body. For example, the housing 12 may include a rotating body 40 that is rotatably mounted to lower arm 30 and defines the external mouth (or tape exit port) 52 through which tape 80 is deployed/retracted from/into housing body 12. Referring to FIGS. 15-16, the rotating body 40 includes a peripheral wall 48, an exit channel 50, tape exit port 52, and rear opening 54. While the peripheral wall 48 may take a variety of shapes (e.g., pointed or tapering), the peripheral wall 48 is advantageously consistently curved with a center of curvature coinciding with the rotational axis 41 of rotating body 40. This rotational axis 41 is advantageously disposed along the midline of housing body 12. The peripheral wall does not extend 360° around rotating body 40, but instead stops short thereof to help form rear opening 54. In addition, peripheral wall 48 includes a recess that forms exit channel 50. The peripheral wall 48 may include suitable external surface texturing as is desired. The exit channel 50 extends along a channel axis 51, and is bounded on its upstream end by exit port 52 and open on its downstream end. As used herein, "upstream" means the direction of tape movement during retraction of the tape 80 and "downstream" means the direction of tape movement during deployment of the tape 80. The front and back sides of channel 50 may advantageously be open, but this is not required in all embodiments. The exit channel 50 is advantageously sized to at least accept a substantial portion of tape coupler 90 therein, with exit port 52 providing a constriction smaller than coupler 90 so as to prevent over-retraction of tape 80. See FIG. 17.

The rotating body 40 may be formed of a base 42a and a complementary top 42b that are joined to form the generally cylindrical rotating body 40. The base 42a may include a baseplate 44a, a pair of upwardly extending posts 46a, and a peripheral wall portion 48a, with the latter two extending upward generally normal to baseplate 44a. The top 42b is advantageously substantially identical to base 42a, but oriented in an inverted fashion. Thus, top 42b includes a baseplate 44b, posts 46b, and peripheral wall portion 48b. The base 44a and top 44b may be secured together by screws 49; but any other form of securing, such as snap-fitting and the like, may be used.

Figure 18:
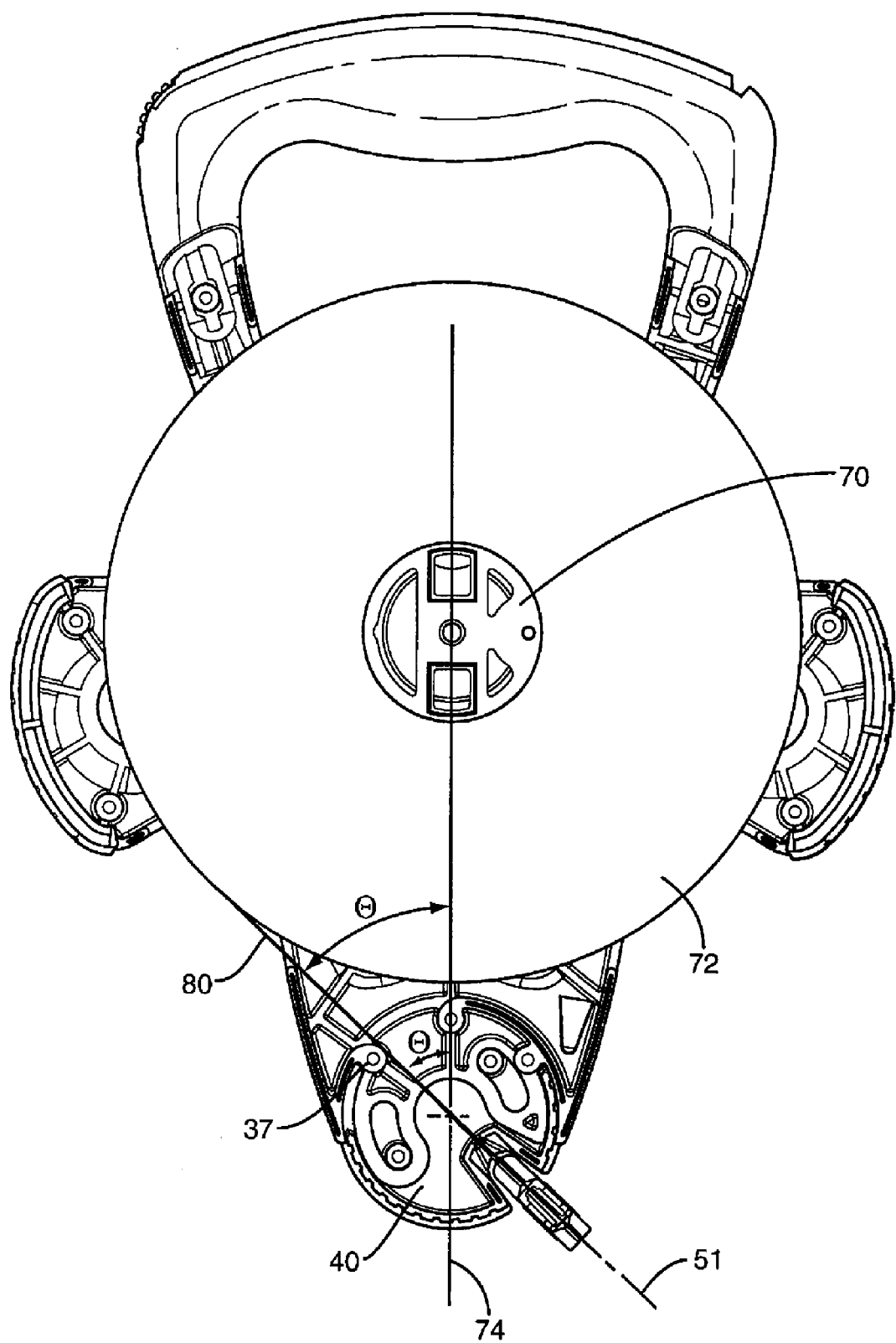
FIG. 18 shows the tape coil in a fully retracted configuration, with the tape measure employing a small reel at the center of the tape coil.
Figure 19:
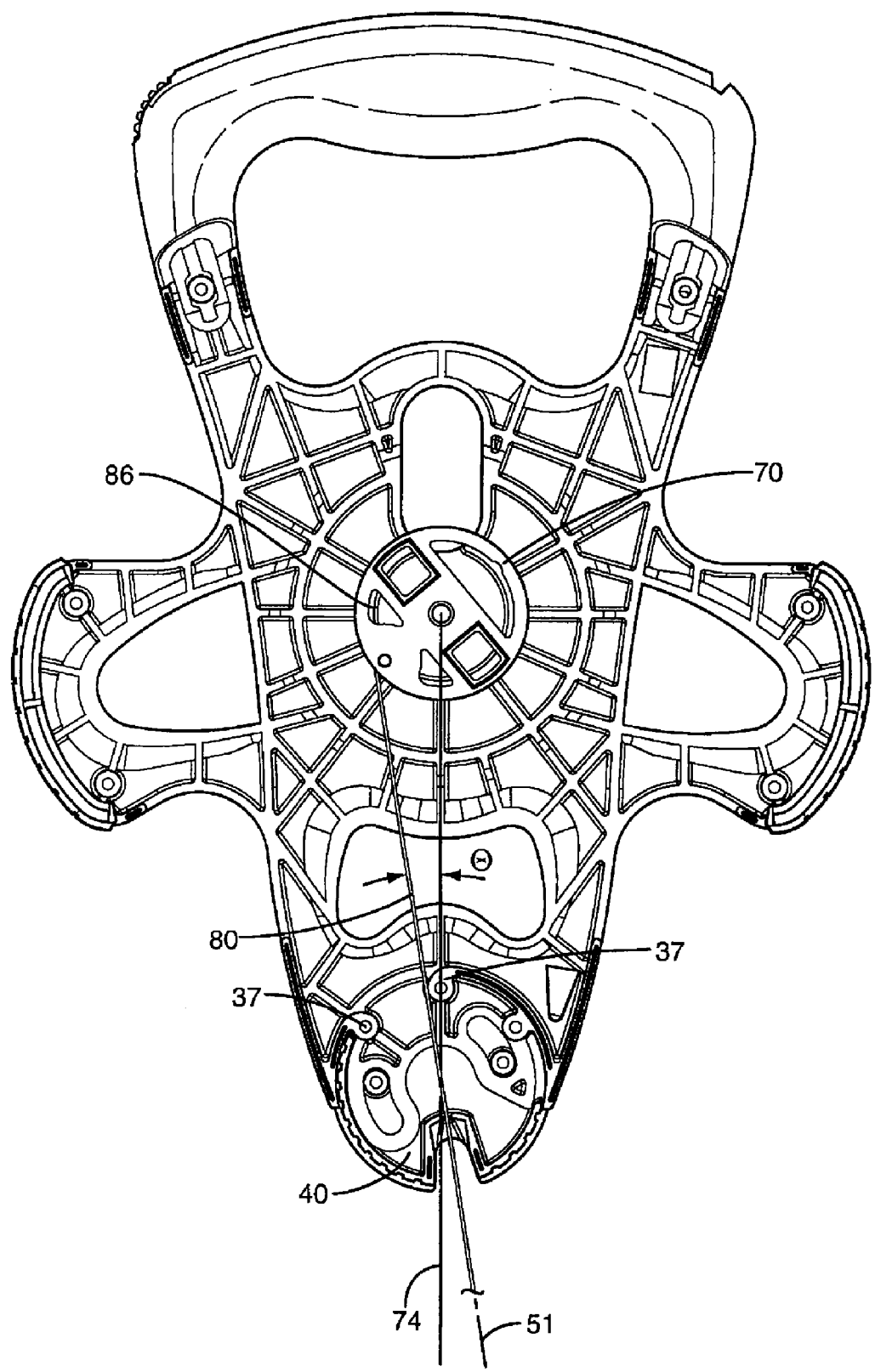
FIG. 19 is similar to FIG. 18, but with the tape coil in a second substantially deployed configuration.

As indicated above, rotating body 40 is mounted to be rotatable with respect to frame 14 about rotation axis 41. See FIGS. 17-19. In order to facilitate the desired rotation of rotating body 40, lower arm 30 of each shell half 14a, 14b advantageously includes a pair of arcuate open-ended slots 34 and a pair of closed arcuate slots 32. The open-ended slots 34 are sized and configured to accept corresponding portions of rotating body peripheral wall 48, and closed slots 32 are sized and configured to receive rotating body posts 46a,46b. Further, as with peripheral wall 48, the slots 32,34 are advantageously curved with a center of curvature at axis 41. The slots 32,34 have lengths appropriate to allow the desired amount of rotation of the rotating body 40 relative to frame 14. Advantageously, the slots 32,34 are configured so that peripheral wall 48 abuts the end of a slot 34 and the posts 46a,46b abut the end of slots 32 at the maximum rotational positions of rotating body 40. Advantageously, the rotating body 40 is able to rotate at least 20°, and advantageously about 35°-40°. In addition, housing 12 may advantageously include arcuate ribs 36 with terminal guide bosses 37 spaced from one another to form passage 38 therebetween. It is intended that tape 80 will be routed from the convolute coil 72 formed on reel 70, through passage 38, and out through exit port 52, see FIG. 17. The guide bosses 37 may be advantageously positioned such that the tape 80 just engages a respective guide boss 37 when fully retracted (FIG. 18) and when fully paid-out (FIG. 19).

As can be appreciated, the size of coil 72 changes as more or less tape 80 is deployed. For example, when the tape 80 is fully retracted, the coil 72 may be said to be in a first configuration of N layers 73 (FIG. 18). As the tape 80 is paid-out, the number of layers 73 decreases, and the coil may be said to be in a second configuration with <N layers 73 (FIG. 19 or other less paid-out configurations). Thus, the size of coil 72 shrinks as the coil 72 changes from the first configuration to the second configuration. Due to the ability of body 40 to rotate, exit channel 50 is able to change its angular orientation such that, despite this change in coil size, channel axis 51 remains tangent to coil 72. Thus, channel axis 51 is oriented tangent to coil 72 for both configurations. However, as can be seen by comparing FIG. 19 to FIG. 18, channel axis 51 is oriented farther from reel axis 71 for the first coil configuration than the second coil configuration. As such, the relative angle Θ between channel axis 51 and a theoretical line 74 between the reel rotational axis 71 and rotating body axis 41 changes during deployment and retraction of tape 80. This change in relative angle is achieved by allowing rotating body 40 to rotate. This action allows the tape 80 to be wound into, and paid-out from, convolute coil 72 on reel 70 with a minimum of induced stress, advantageously without requiring any re-direction of the tape 80 internal to housing 12.

In addition, the inclusion of the rotating body 40 may help prevent undesirable whipping of the tape 80 during retraction. The rotation of rotating body 40 allows the mouth 52 to be positioned at different angular orientations, thereby allowing the housing 12 to dynamically adapt to differing intake angles of the tape 80. This action is believed to reduce the potential for the tape 80 to whip back and forth during retraction, which should help reduce potentially damaging stresses on the tape 80.

Figure 20:
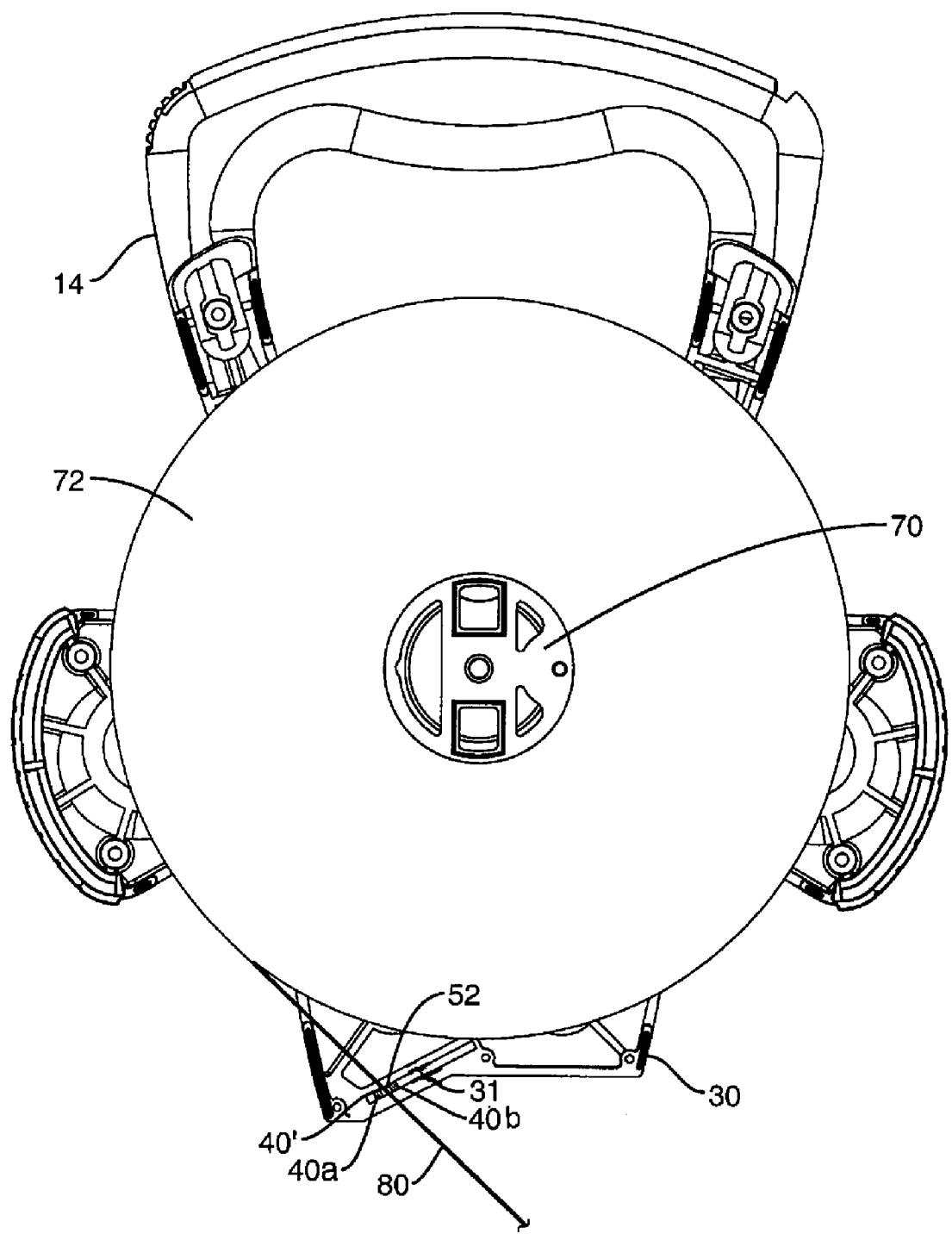
FIG. 20 shows another embodiment of a tape measure employing another embodiment of a moveable mouthpiece body, with the tape coil in a substantially retracted configuration.
Figure 21:
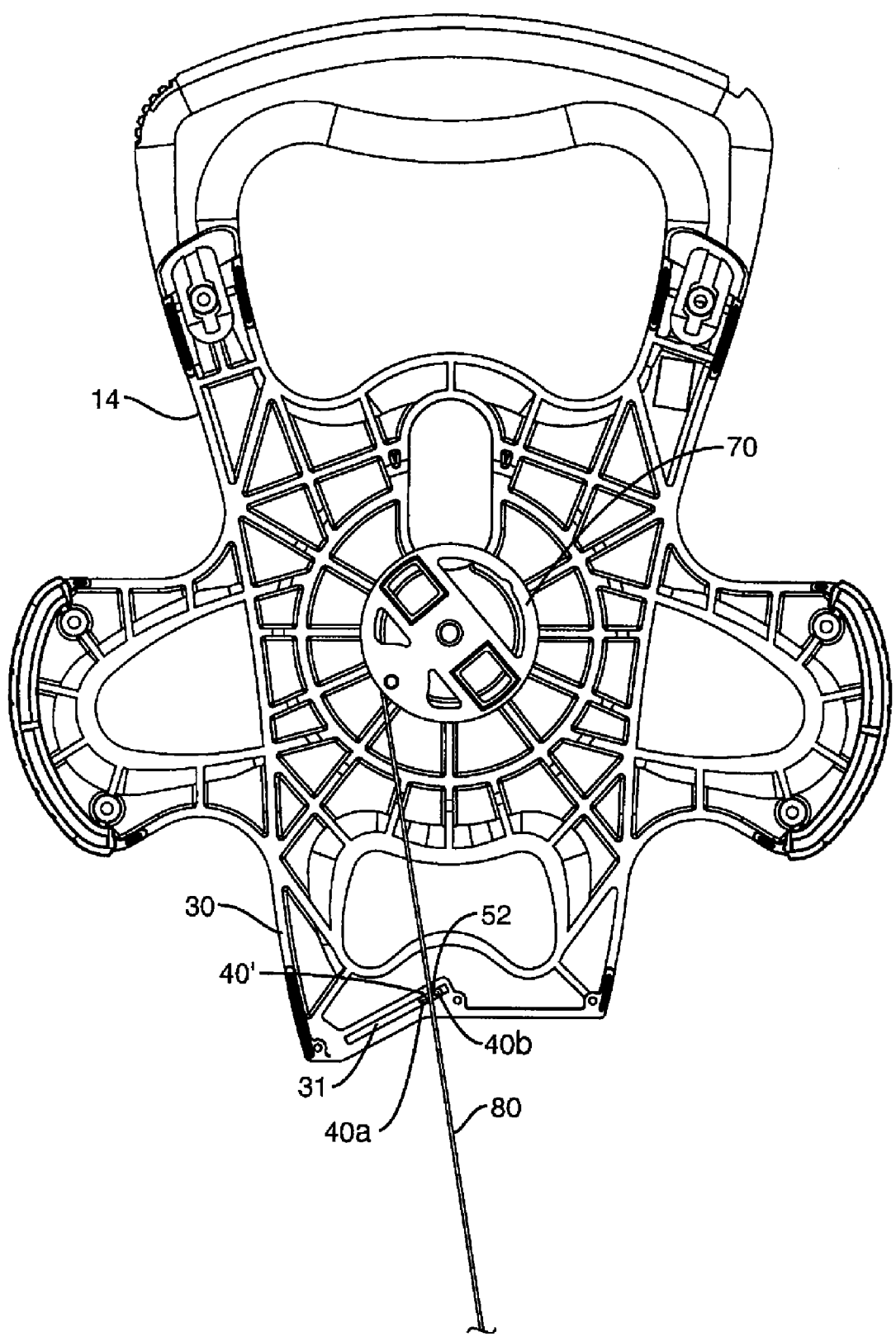
FIG. 21 is similar to FIG. 20, but with the tape coil in a substantially deployed configuration.

The discussion above has assumed that the moving body that defines the moveable tape exit port 52 is a rotating body 40. While such is believed advantageous, a non-rotating body may alternatively be used in some embodiments. For example, the moving body may take the form of a slider 40' constrained to move along a track 31 in frame 14, with the track 31 being either linear or arcuate and advantageously disposed in lower arm 30. The slider 40' would define the exit port 52, such as by having two upright fingers 40a,40b, with the exit port 52 being between the space between fingers 40a,40b. Such a moving body 40' would slide back and forth along the track 31 in order to allow the tape 80 to exit/return along a path that is tangent to coil 72, whether the coil 72 is in the first mostly retracted configuration (FIG. 20) or in a second mostly deployed configuration (FIG. 21). The position of the slider 40' along track 31 depends on the number of layers 73 in coil 72, compare FIG. 20 to FIG. 21, with the interaction with tape 80 causing the slider 40' to move in response to changes in size of the coil 72.

The present invention may be carried out in other specific ways than those herein set forth without departing from the scope and essential characteristics of the invention. Further, the various aspects of the disclosed device and method may be used alone or in any combination, as is desired. The disclosed embodiments are, therefore, to be considered in all respects as illustrative and not restrictive, and all changes coming within the meaning and equivalency range of the appended claims are intended to be embraced therein.

What is claimed is:

1. A tape measure, comprising:
   a housing comprising a frame and a rotating body rotatingly mounted to said frame; said rotating body defining an external wall of said housing and comprising a tape exit port defined in said external wall;
   a measuring tape supported by said housing and selectively deployable from said housing via said exit port;
   said measuring tape forming a convolute coil within said housing and extending away from said coil along a substantially straight path that extends from a peripheral edge of said coil to the exit port.

2. The tape measure of claim 1 wherein said rotating body includes an external recess aligned with said exit port and disposed downstream therefrom.

3. The tape measure of claim 1 wherein said rotating body is rotatable at least 20°.

4. The tape measure of claim 1 wherein said rotating body comprises first and second posts, and wherein said frame includes first and second closed arcuate slots for engaging said first and second posts, respectively.

5. The tape measure of claim 1 wherein said rotating body includes a peripheral wall; and wherein said frame includes first and second arcuate slots open on one end for receiving said peripheral wall.

6. The tape measure of claim 1 wherein said rotating body rotates about an axis, and wherein said rotating body further comprises a peripheral wall that at least partially surrounds said axis and forms a portion of said housing external wall.

7. The tape measure of claim 1:
further comprising a crank mechanism for manually retracting said tape into said housing;
wherein said rotating body includes an external recess aligned with said exit port and disposed downstream therefrom; wherein said rotating body further comprises a rear opening disposed upstream from said exit port, said tape extending through said rear opening;
wherein said rotating body comprises first and second posts and a peripheral wall;
wherein said frame includes first and second closed arcuate slots for engaging said first and second posts, respectively; wherein said frame includes third and fourth arcuate slots open on one end for receiving said peripheral wall;
wherein said frame comprises a pair of guides disposed upstream with respect to said rotating body, said tape routed between said guides;
wherein said rotating body is rotatable at least 20°;
wherein said rotating body is formed by two portions secured together.

8. The tape measure of claim 1 wherein said rotating body further comprises a rear opening disposed upstream from said exit port, said tape extending through said rear opening.

9. The tape measure of claim 8 wherein said frame comprises a pair of guides disposed upstream with respect to said rotating body, said tape routed between said guides.

10. The tape measure of claim 1 wherein said rotating body is formed by two portions secured together.

11. The tape measure of claim 10 wherein said two portions of said rotating body are substantially identical.

12. A tape measure, comprising:
a casing;
a reel supported by said casing for rotation about a first axis;
a mouthpiece body rotatably mounted to said casing for rotation about a second axis spaced from said first axis; said mouthpiece body comprising an exit channel extending along an exit axis and upstream bounded by a tape exit port; said tape exit port rotationally moveable relative to said second axis;
a measuring tape forming a convolute coil of multiple layers about said reel, wherein the number of layers changes as said tape is deployed or retracted through said exit port; said convolute coil having a first configuration of N layers when said tape is fully retracted and a second configuration of fewer layers when said tape is deployed;
wherein said exit axis is oriented tangent to said convolute coil for both said first and second configurations; said exit axis oriented closer to said first axis when said convolute coil assumes said second configuration than when said convolute coil assumes said first configuration.

13. The tape measure of claim 12 wherein said mouthpiece body is rotatable at least 35°.

14. The tape measure of claim 12 wherein said casing comprises a handle spaced from said first axis; said first axis disposed between said handle and said mouthpiece body.

15. The tape measure of claim 12 wherein said mouthpiece body further comprises a rear opening disposed upstream from said tape exit port, said tape extending through said rear opening; wherein said casing comprises a pair of guides disposed upstream respect to said rear opening of said mouthpiece body, said tape routed between said guides.

16. The tape measure of claim 12 wherein said mouthpiece body comprises first and second posts, and wherein said casing includes first and second closed arcuate slots for engaging said first and second posts, respectively.

17. The tape measure of claim 15 wherein said tape touches one of said guides when said tape is in said first configuration.

18. The tape measure of claim 12 wherein said mouthpiece body is formed by two portions secured together.

19. A tape measure, comprising:
a housing comprising a frame and a mouthpiece body mounted to said frame for rotation about a first axis; said mouthpiece body defining an external wall of said housing and comprising a tape exit port defined in said external wall; said mouthpiece body further comprising an exit channel extending along an exit axis and upstream bounded by said tape exit port;
a reel supported by said housing for rotation about a second axis;
a measuring tape forming a convolute coil about said reel and selectively deployable through said tape exit port;
a first theoretical line extending through said first and second axes;
wherein said mouthpiece body is mounted to said housing such that an angular relationship between said exit axis and said line varies depending on an amount of said tape forming said coil on said reel.

20. The tape measure of claim 19 wherein said casing comprises a handle spaced from said second axis; said second axis disposed between said handle and said mouthpiece body.

21. The tape measure of claim 19 wherein said mouthpiece body comprises first and second posts, and wherein said frame includes first and second closed arcuate slots for engaging said first and second posts, respectively.

22. The tape measure of claim 19 wherein said frame includes first and second arcuate slots open on one end for receiving said external wall.

23. The tape measure of claim 19 wherein said mouthpiece body further comprises a rear opening disposed upstream from said tape exit port, said tape extending through said rear opening.

24. The tape measure of claim 23 wherein said frame comprises a pair of guides disposed upstream with respect to said rear opening of said mouthpiece body, said tape routed between said guides.

25. The tape measure of claim 19 wherein said angular relationship is variable at least 35°.

26. The tape measure of claim 24 wherein said tape touches one of said guides when said tape is fully retracted.

27. The tape measure of claim 19 wherein said mouthpiece body is formed by two portions secured together.

28. A method of operating a tape measure, comprising:
deploying a measuring tape from a housing at a tape exit port; said housing having a frame and a mouthpiece body moveably mounted to the frame; said mouthpiece body forming said exit port;
retracting said deployed tape and thereby increasing a size of a convolute coil of said measuring tape associated with said housing;
moving said mouthpiece body relative to said frame in response to changes in size of said convolute coil during said retracting.

29. The method of claim 28 wherein said moving said mouthpiece body comprises rotating said mouthpiece body.

30. The method of claim 28 wherein a tape extends through said exit port along a theoretical line that is tangent to said coil.

31. A tape measure, comprising:
- a housing comprising a frame and a mouthpiece body moveably mounted to said frame; said mouthpiece body comprising a tape exit port;
- a reel rotatably supported by said frame;
- a measuring tape forming a convolute coil about said reel and selectively deployable through said tape exit port; and
- wherein said mouthpiece body moves relative to said frame in response to changes in size of said convolute coil.

32. The tape measure of claim 31 wherein said mouthpiece body rotates relative to said frame depending on the size of said convolute coil.

33. The tape measure of claim 31 wherein said frame includes a track, and wherein said mouthpiece body comprises a slider constrained to move along said track.

34. The tape measure of claim 31 wherein said tape, between said exit port and said convolute coil, extends along a theoretical line from said tape exit port to said convolute coil that is tangent to said convolute coil.

35. The tape measure of claim 31 wherein said mouthpiece body is rotatably mounted to said frame.

36. The tape measure of claim 31 wherein said convolute coil comprises multiple layers, and wherein the number of layers changes as said tape is deployed or retracted through said exit port; said convolute coil having a first configuration of N layers and a second configuration of fewer layers depending on the amount of tape deployed; and wherein said mouthpiece body moves relative to said frame in response to changes in the number of layers in said convolute coil.

37. The tape measure of claim 31 wherein said mouthpiece body is slidably mounted to said frame.

38. The tape measure of claim 34 wherein said tape, downstream from said exit port, extends along said theoretical line.

39. The tape measure of claim 37 wherein said mouthpiece body is slidably mounted to said frame for linear movement.

* * * * *